United States Patent [19]

Komurasaki et al.

[11] Patent Number: 5,619,108
[45] Date of Patent: Apr. 8, 1997

[54] VEHICLE ALTERNATING-CURRENT GENERATOR CONTROL DEVICE AND VEHICLE ALTERNATING-CURRENT GENERATOR

[75] Inventors: Keiichi Komurasaki; Kyoko Kurusu, both of Himeji, Japan

[73] Assignee: Mitsubishi Denki Kabushiki Kaisha, Tokyo, Japan

[21] Appl. No.: 500,129

[22] Filed: Jul. 10, 1995

[30] Foreign Application Priority Data

Jul. 13, 1994 [JP] Japan .................... 6-161499

[51] Int. Cl.$^6$ ........................................ H02P 9/30
[52] U.S. Cl. .................. 318/140; 318/145; 310/68 R; 361/784
[58] Field of Search ................... 318/140–150; 361/784, 421, 785, 393, 794, 392, 813, 396; 439/45, 75, 70, 47, 72, 65, 654, 68, 69; 257/697, 698, 691, 723, 724; 174/260, 262, 52.4

[56] References Cited

U.S. PATENT DOCUMENTS

| | | | |
|---|---|---|---|
| 4,504,752 | 3/1985 | Iwaki et al. ................... | 310/68 |
| 4,862,076 | 8/1989 | Renner et al. ................. | 324/158 F |
| 4,872,844 | 10/1989 | Grebe et al. ................... | 439/69 |
| 5,031,023 | 7/1991 | Murari et al. .................. | 357/72 |
| 5,151,039 | 9/1992 | Murphy ......................... | 439/70 |
| 5,161,098 | 11/1992 | Balakrishnan .................. | 363/144 |
| 5,168,432 | 12/1992 | Murphy et al. ................. | 361/421 |
| 5,180,976 | 1/1993 | Van Loan et al. .............. | 324/158 F |
| 5,288,236 | 2/1994 | McIntyre ....................... | 439/70 |
| 5,289,117 | 2/1994 | Van Loan et al. .............. | 324/158 F |
| 5,438,481 | 8/1995 | Murphy et al. ................. | 361/813 |
| 5,444,298 | 8/1995 | Schutz .......................... | 257/691 |
| 5,445,526 | 8/1995 | Hoshino et al. ................ | 439/69 |
| 5,460,531 | 10/1995 | Vivio ............................. | 439/70 |
| 5,479,319 | 12/1995 | Werther ......................... | 361/784 |
| 5,481,203 | 1/1996 | Appold ........................... | 439/654 |
| 5,481,436 | 1/1996 | Werther ......................... | 361/784 |

FOREIGN PATENT DOCUMENTS 165082  4/1981  Japan .

*Primary Examiner*—Paul Ip
*Attorney, Agent, or Firm*—Sughrue, Mion, Zinn, Macpeak & Seas

[57] ABSTRACT

A vehicle alternating-current generator control device having a single in-line molded package type control component with its leads arranged on one side. Disposed on the control component is an extension adapter with its ends connected to the leads of the control component and other ends connected to conductor links. A holder designed for an open-type control component is thus used for a single in-line molded package type control component.

4 Claims, 10 Drawing Sheets

VEHICLE ALTERNATING-CURRENT GENERATOR CONTROL DEVICE AND VEHICLE ALTERNATING-CURRENT GENERATOR

BACKGROUND OF THE INVENTION

1. Field of the Invention

The present invention relates to a control device for controlling the voltage generated by a vehicle alternating current generator and the vehicle alternating current generator that supplies power to an electrical load such as a battery using the control device mounted on a vehicle.

2. Description of the Related Art

FIG. 6 is a lateral cross-sectional view of a conventional vehicle alternating-current generator 1. FIG. 7 is a cross-sectional view showing the major portion of the vehicle alternating current generator of FIG. 6. A bracket 2 is constructed by connecting a front bracket 2a to a rear bracket 2b by bolts 3. Disposed along the inner wall of the bracket 2 is a stator 5 made up of stator cores 6 around which stator windings 7 are wrapped. An axis of rotation 8 is inserted along the center line of the bracket 2. The axis of rotation 8 is rotatably supported at its both ends by bearing 9. An exciting core 10 having an unshown exciting coil is attached to the middle portion of the axis of rotation 8.

Disposed on the inside of the front bracket 2a is a control device 11 for controlling the voltage generated by the alternating-current generator 1. A pair of brushes 13 is mounted within the holder 12 of the control device 11. Springs 14 urge the brushes 13 so that the brushes 13 are slidably in contact with slip rings 15 attached onto the axis of rotation 8 at a predetermined pressure. A rectifier device 16 that rectifies the alternating current from the stator windings 7 into a direct current is mounted opposite the control device 11, diagonally across the axis of rotation 8. Disposed next to the rectifier unit 16 is an auxiliary rectifier unit 17 for feeding a current to the exciting coil.

FIG. 8 is a front view showing the control device 11 only of FIG. 7. FIG. 9 is a view of the control device 11 viewed vertically from above in FIG. 8 as shown by the arrow B. FIG. 10. is a view of the control device 11 viewed horizontally from the side in FIG. 8 as shown by the arrow A. FIG. 11 is a cross-sectional view of the control device 11 of FIG. 8, taken along the line C—C. FIG. 12 shows the major portion of FIG. 10.

A connector 18 for external connection is integrally attached onto the holder 12. The holder 12 has a ceramic substrate 19 layered on top of a heat sink 24. The ceramic substrate 19 has a hybrid IC 21 containing electrical components and an IC for controlling the voltage generated by the vehicle alternating-current generator. FIG. 13 shows the circuit configuration of the hybrid IC 21, the main component of the control unit, which will be described in detail later. The holder 12 has a silicone resin filler 22 that protects the voltage regulating hybrid IC 21 against moisture and dust. First leads 23a of the hybrid IC 21 vertically extend from one end of the substrate 19 and second leads 23b vertically extend from the other end of the substrate 19. The ends of the first leads 23a are connected to first conductor links 70a leading to the main unit of the alternating-current generator. The ends of the second leads 23b are connected to second conductor links 70b that are in turn connected to a battery (not shown). The conductor links 70a, 70b are produced by press-cutting a thin steel sheet, and then insert-molded in the holder 12.

FIG. 13 is the schematic diagram of the alternating-current generator 1 mounted on a vehicle. The main unit 100 of the alternating-current generator houses three-phase star-connected armature coils 101 and an exciting coil 102. The full-wave rectifier 200 connected to the main unit 100 of the alternating-current generator has an rectifier output terminal 201, a ground terminal 202, input terminals 203 that are connected to the ends of the armature coils 101, and diodes connected between the input terminals 203 and the output terminal 201, and diodes connected between the input terminals 203 and the ground terminal 202. The voltage regulating section 300 connected to the full-wave rectifier 200 comprises voltage dividing resistors 301, 302, a zener diode 303, the cathode of which is connected to the junction of the resistors 301 and 302, a control transistor 304, the base of which is connected to the anode of the zener diode 303, and the emitter of which is grounded, a base current supplying resistor 305, one end of which is connected the collector of the control transistor 304, a switching element such as an emitter-grounded power transistor 306, the base of which is connected to the collector of the control transistor 304 and the collector of which is connected to the rectifier output terminal 201 of the rectifier 200 via the exciting coil 102 of the main unit 100 of the alternating-current generator, and a suppressing diode 307 connected between the rectifier output terminal 201 and the collector of the power transistor 306 with its anode to the terminal 201.

A battery 400 is connected between the rectifier output terminal 201 of the full-wave rectifier 200 and ground. A key switch 500 is connected between the positive terminal of the batter 400 and the other end of the base current supplying resistor 305 in the voltage regulating section 300. A detector/controller section 600 is connected between the voltage regulating section 300 and the key switch 500. The detector/controller section 600 comprises a smoothing resistor 601, one end of which is connected to one of the input terminals 203 of the full-wave rectifier 200, namely connected to one of the armature coils 101 of the main device of the alternating-current generator 100, a backward current componenting diode 602, the anode of which is connected to the other end of the smoothing resistor 601, a smoothing capacitor 603 connected between the cathode of the backward current componenting diode 602 and ground, a smoothing resistor 604, one end of which is connected to the cathode of the backward current componenting diode 602, and a control transistor 605, the base of which is connected to the other end of the smoothing resistor 604 and the emitter of which is at ground. The detector/controller section 600 further comprises a base current supplying resistor 606 connected between the controller of the control transistor 605 and the key switch 500, and a switching element such as a power transistor 607, the base of which is connected to the collector of the control transistor 605 and the emitter of which is at ground. An indicator lamp 700 is connected between the power transistor 605 and the key switch 500.

At the moment the key switch 500 is switched on in the vehicle alternating-current generator 1, the generator main unit 100 does not start generating yet. A generation signal to be described later is not yet fed to the detector/controller section 600, and thus the control transistor 605 remains nonconductive. When the key switch 500 is switched on, however, the battery 400 is connected to the power transistor 607 via the base current supplying transistor 606 allowing a current to flow through the base of the power transistor 607. The power transistor 607 thus becomes conductive, causing the indicator lamp 700 to light to indicate that the generator main unit 100 is in a generation inoperative state.

The voltage of the battery 400 is high enough to cause the zener diode 303 in the voltage regulating section 300 to conduct when the key switch 500 is switched on. The control transistor 304 remains nonconductive. A current flows through the base of the power transistor 607 from the battery 400 via the base current supplying resistor 305, causing the power transistor 607 to conduct and thereby causing an exciting current to flow through the exciting coil 102.

When the exciting coil 102 is driven by the exciting current, the generator main unit 100 starts generating current. The armature coils 101 give a generation signal to the detector/controller section 600. The output voltage of the generator main unit 100 rises. Upon receiving the generation signal, the control transistor 605 in the detector/controller section 600 becomes conductive, causing the power transistor 607 to cut off. The indicator lamp 700 goes off, indicating that the generator main unit 100 is now generating current.

When the output voltage of the generator main unit 100 is lower than a predetermined value, both the zener diode 303 and the control transistor 304 remain nonconductive while the power transistor 306 remains continuously conductive. As a result, the exciting current flowing through the exciting coil 102 increases, causing the output voltage of the generator main unit 100 to rise even further. When the output voltage rises above the predetermined value, both the zener diode 303 and control transistor 304 become conductive, causing the power transistor 306 to cut off. The exciting current flowing through the exciting coil 102 decreases, resulting in a decreased output voltage. The above operation is repeated so that the output voltage of the generator is controlled to the predetermined value by means of the voltage regulating section 300.

In the control device of the vehicle alternating-current generator thus constructed, conductor links 70a, 70b in the holder 12 are arranged in two rows, one on the left-hand and the other on the right-hand sides, so that connection with the exciting coil 102 and the battery 400 is facilitated. The control component for regulating the generated voltage comprises HIC 21 formed of the ceramic substrate 19 on which electronic components are mounted as shown in FIGS. 11 and 12, first four leads 23a (designated letters d, e, f and g in FIG. 13) on one side, and second three leads 23b (designated letters a, b, and c in FIG. 13) on the other side mounted in the holder 12.

Since the control component of an open type such as HIC 21 with exposed electronic components is flexible enough to accommodate specification change, it is advantageously applied for use in non-standard or semi-standard specification control device. Since electronic components are exposed, care must be exercised while the control component is in the course of placement and mounting on the holder 12. Furthermore, automated mounting of the control component is difficult.

The control component having a standardized specification, as a standardized control component, may be constructed of a control component in a molded package, with a view to resolving the above problem and facilitating automated mounting process.

An open-type control component may be applied for use in non-standard specification or semi-standard specification control component, and a molded-package type control component may be applied for use in standard specification control component. When a molded-package-type control component is manufactured, it is a typical practice to adopt a single in-line molded package design with its leads arranged on a single side from the standpoint of easy mounting onto a substrate and space saving.

The open-type control component has the first and second leads 23a, 23b in two separate rows, one on the left-hand side and the other on the right-hand side. In the single in-line molded package type control component, the leads are arranged on a single row on a single side, and a holder must be so designed that its conductor links are aligned with their associated leads. Thus, two types of holder 12 are required, one for accommodating the open-type control component and the other for accommodating the single in-line molded package type control component.

SUMMARY OF THE INVENTION

The present invention has been developed to solve the above problem. It is an object of the present invention to provide a vehicle alternating-current generator control device and a vehicle alternating-current generator which allow a holder for an open-type control component to accommodate a single in-line molded package type control component.

The vehicle alternating-current generator control device according to the present invention comprises a control component having a voltage regulating section that regulates a generated voltage by controlling the current flowing through the exciting coil of a vehicle alternating-current generator, said control component being encased in a single in-line molded package with its leads arranged on a single side and said control component housed in a holder provided with conductor links for external connection, and an extension adapter having a plurality of extension leads, one end of each lead being connected to a lead of the control component and the other end of each lead being connected to a conductor link.

The vehicle alternating-current generator according to the present invention comprises an exciting coil, a control component having a voltage regulating section that regulates a generated voltage by controlling the current flowing through the exciting coil, said control component encased in a single in-line molded package with its leads arranged on a single side and said control component housed in a holder provided with conductor links for external connection, and an extension adapter having a plurality of extension leads, one end of each lead being connected to a lead of the control component and the other end of each lead being connected to a conductor link.

DETAILED DESCRIPTION OF THE PREFERRED EMBODIMENTS

Figure 1:
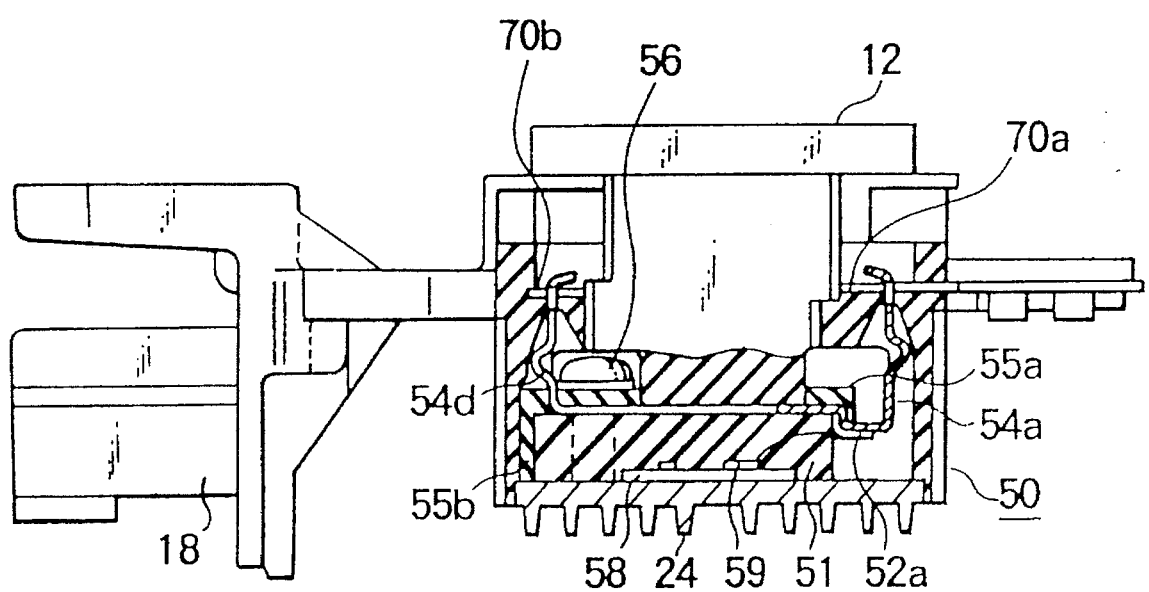
FIG. 1 is a lateral, cross-sectional view showing the control device, with portions broken away, according to an embodiment of the present invention

Referring now to the drawings, the present invention is discussed. FIG. 1 is a lateral, cross-sectional view showing the control device, with portions broken away, according to an embodiment of the present invention. Those components equivalent to those with reference to FIGS. 6 through 13 are designated with the same reference numerals, and their explanation will be omitted.

Housed in the holder 12 of a control device 50 is a control component 51 of a rectangular parallelpiped (25×20×5 mm$^3$) for controlling the voltage generated by a vehicle alternating-current generator. The control component 51 contains a hybrid IC 59 on a copper frame 58 and is sealed with epoxy resin. Eight leads 52 (one of which is a dummy lead) are extended from one side of the control component 51.

Figure 2:
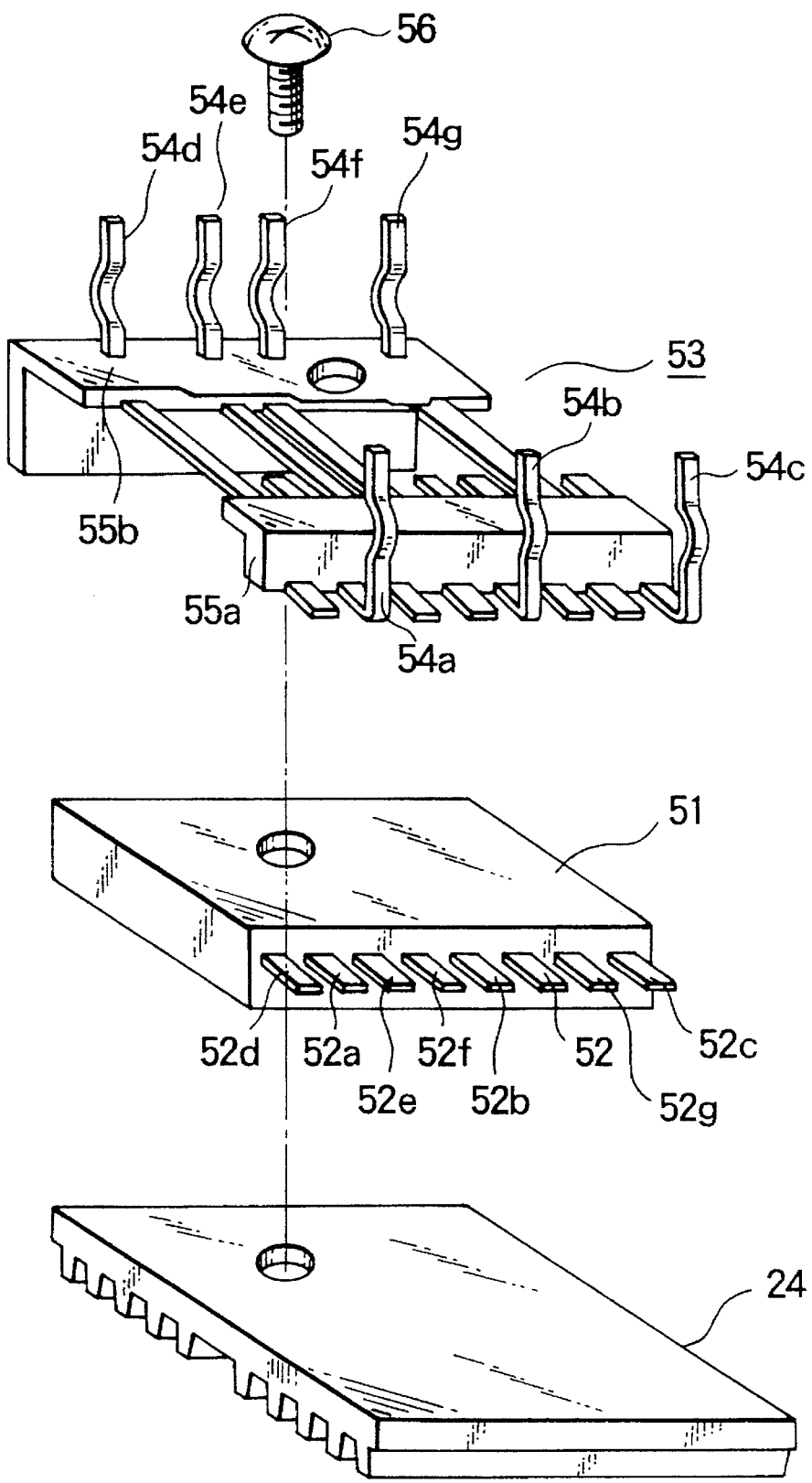
FIG. 2 is an exploded, perspective view showing the control component of FIG. 1.

FIG. 2 is an exploded, perspective view showing the control component in FIG. 1. An extension adapter 53 disposed above the single in-line molded package control component 51 has first extension leads 54a, 54b and 54c ultrasonically-welded to leads 52a, 52b, and 52c respectively, and second extension leads 54d, 54e, 54f, and 54g ultrasonically-welded to leads 52d respectively, 52e, 52f, and 52g, with the extension leads integrally supported by a first alignment portion 55a and a second alignment portion 55b. The first alignment portion 55a and second alignment portion 55b are formed of resin and L-shaped in cross-section. The first and second alignment portions 55a, 55b receive both sides of the control component 51 so that the control component 51 is correctly aligned with the extension adapter 53.

The first extension leads 54a, 54b, and 54c respectively connected to the leads 52a, 52b, 52c (respectively corresponding to points a, b and c in FIG. 13) extend upright from the first alignment portion 55a and are soldered to first conductor links 70a which in turn are connected to the exciting coil 102 in the alternating-current generator main unit 100, ground and one of the armature coils 101. The second extension leads 54d, 54e, 54f, and 54g, respectively ultrasonically-welded to leads 52d, 52e, 52f and 52g (corresponding to points d, e, f and g in FIG. 13) extend horizontally above the control component 51 and reach the second alignment portion 55b, from which the second extension leads 54d, 54e, 54f, and 54g extend upright to be soldered to the second conductor links 70b that are in turn connected to a battery 400. The extension adapter 53 which is aligned with the control component 51 by its first and second alignment portions 55a, 55b is secured to the control component 51 and a heat sink 24 by a screw 56.

In the vehicle alternating-current generator thus constructed, leads 52a through 52c projected from one side of the single in-line molded package control component 51 are connected to the generator main unit 100 and ground via the first extension leads 54a through 54c and the first three conductor links 70a. The leads 52d through 52g are connected to the battery 400 via the second extension leads 54d through 54g and second four conductor links 70b. By aligning the ends of the extension leads 54a through 54g of the adapter 53 with the conductor links 70a, 70b of the holder 12 for open-type control component, the holder 12 designed for open-type control component is used, as it is, for the single in-line molded package type control component as well.

When a dual in-line molded package type control component is used, its leads may be directly connected to conductor links. When a single in-line molded package type control component is used, an extension adapter may be disposed on top of the single in-line molded package in a holder 12.

Figure 3:
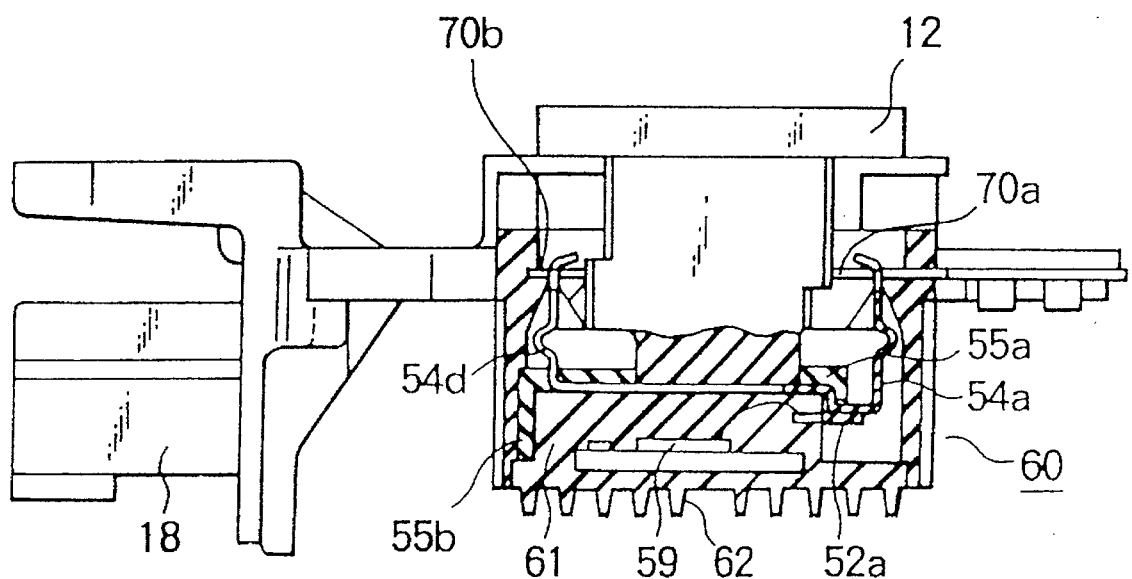
FIG. 3 is a cross-sectional view of the control device, with portions broken away, according another embodiment of the present invention.

FIG. 3 is the cross-sectional view of the control device 60 with portions broken away according to another embodiment of the present invention. In the control device 60, the control component 61 and a heat sink 62 are integrally formed by molding a mixture of epoxy resin and alumina (at 60×10$^{-4}$ Kcal/cm·sec·°C.). The manufacturing step of preparing a separate heat sink and attaching the heat sink onto the control component is thus eliminated.

Figure 4:
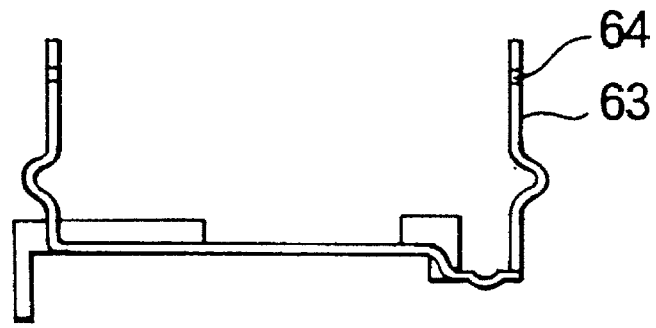
FIG. 4 is a front view showing the extension adapter according to another embodiment of the present invention.
Figure 5:
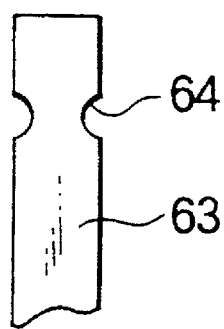
FIG. 5 is a side view showing the extension adapter of FIG. 4.
Figure 6:
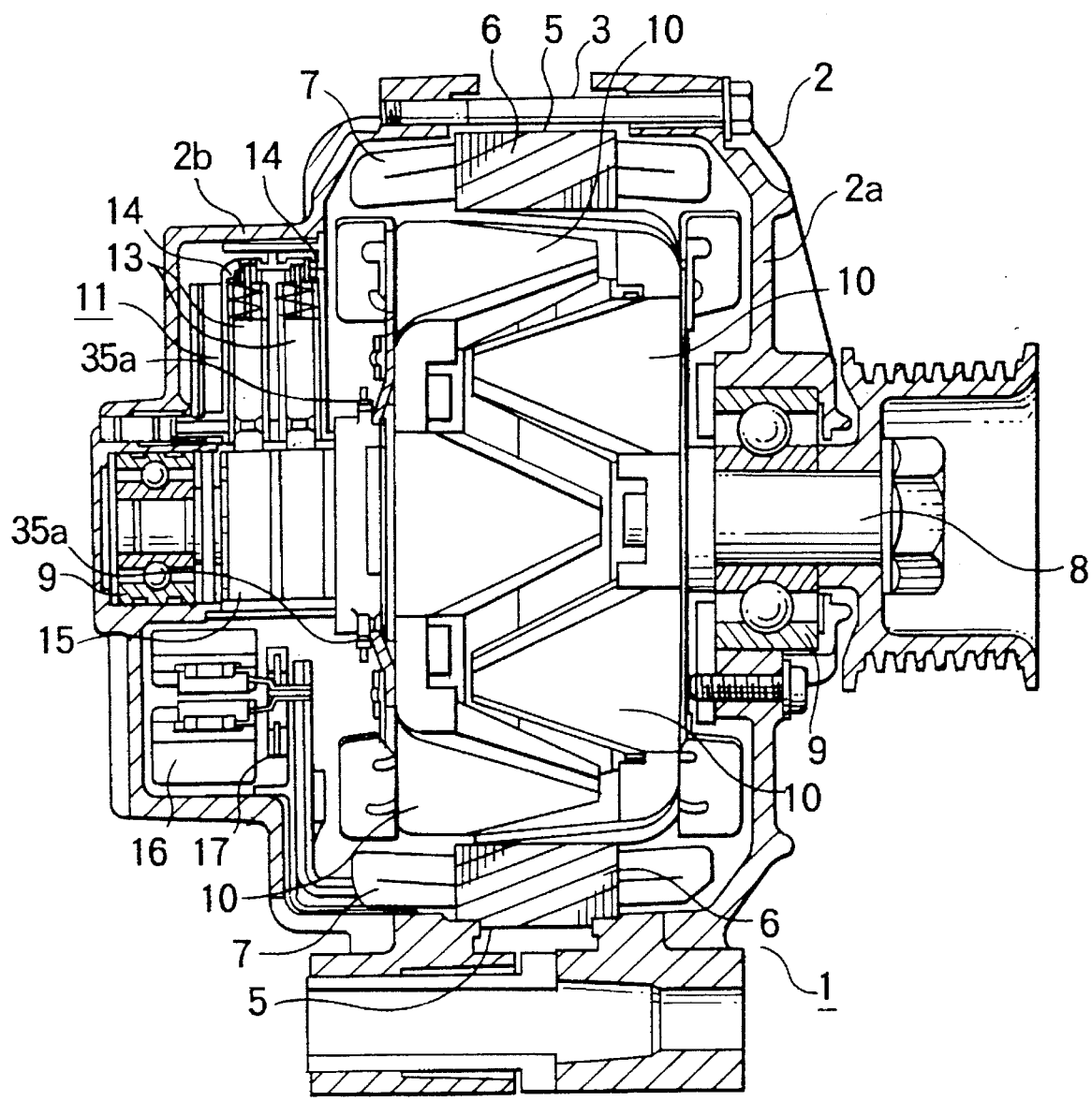
FIG. 6 is a cross-sectional view showing an example of the conventional vehicle alternating-current generator.
Figure 7:
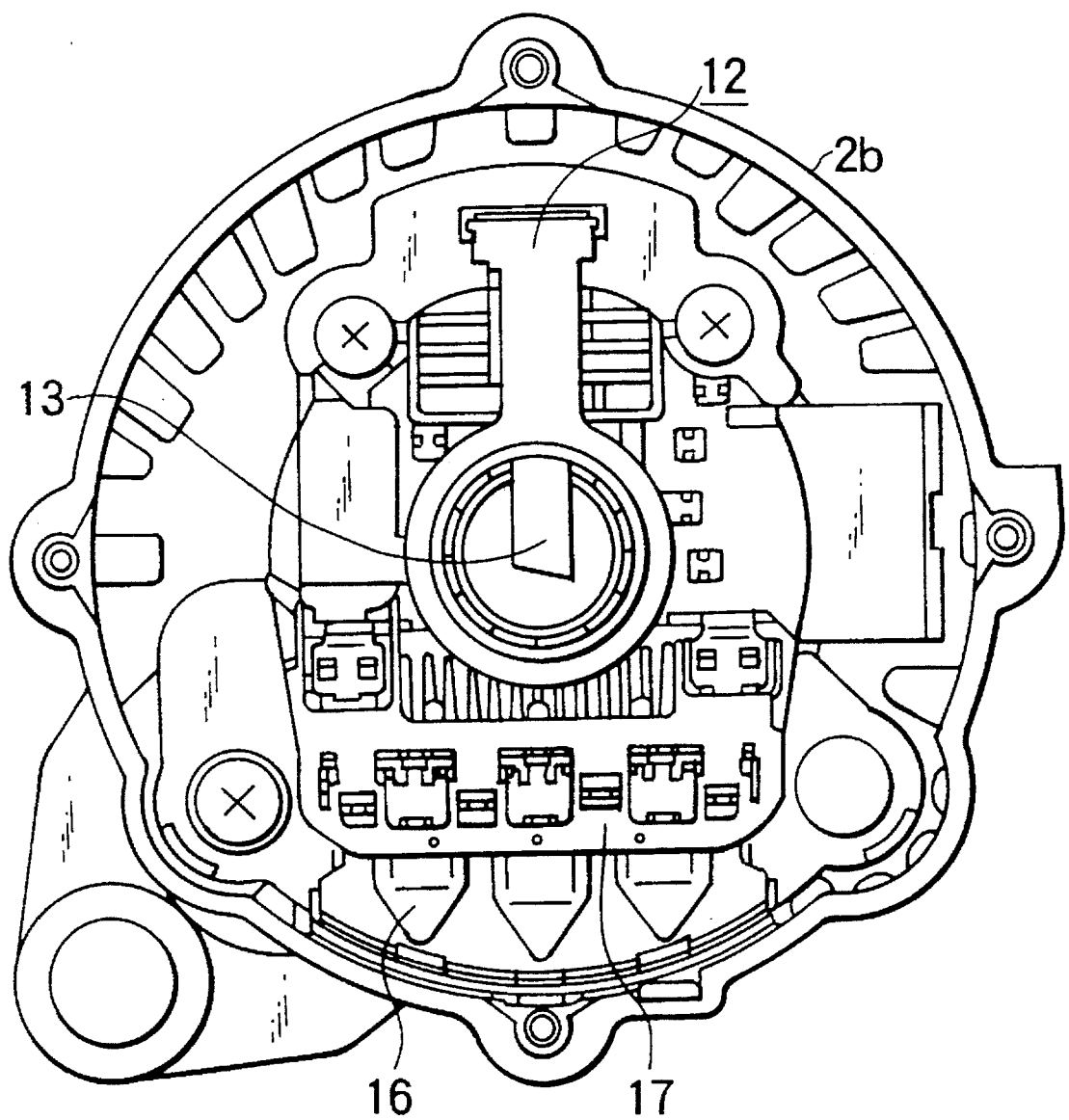
FIG. 7 is a cross-sectional view showing the major portion of the conventional vehicle alternating-current generator of FIG. 6.
Figure 8:
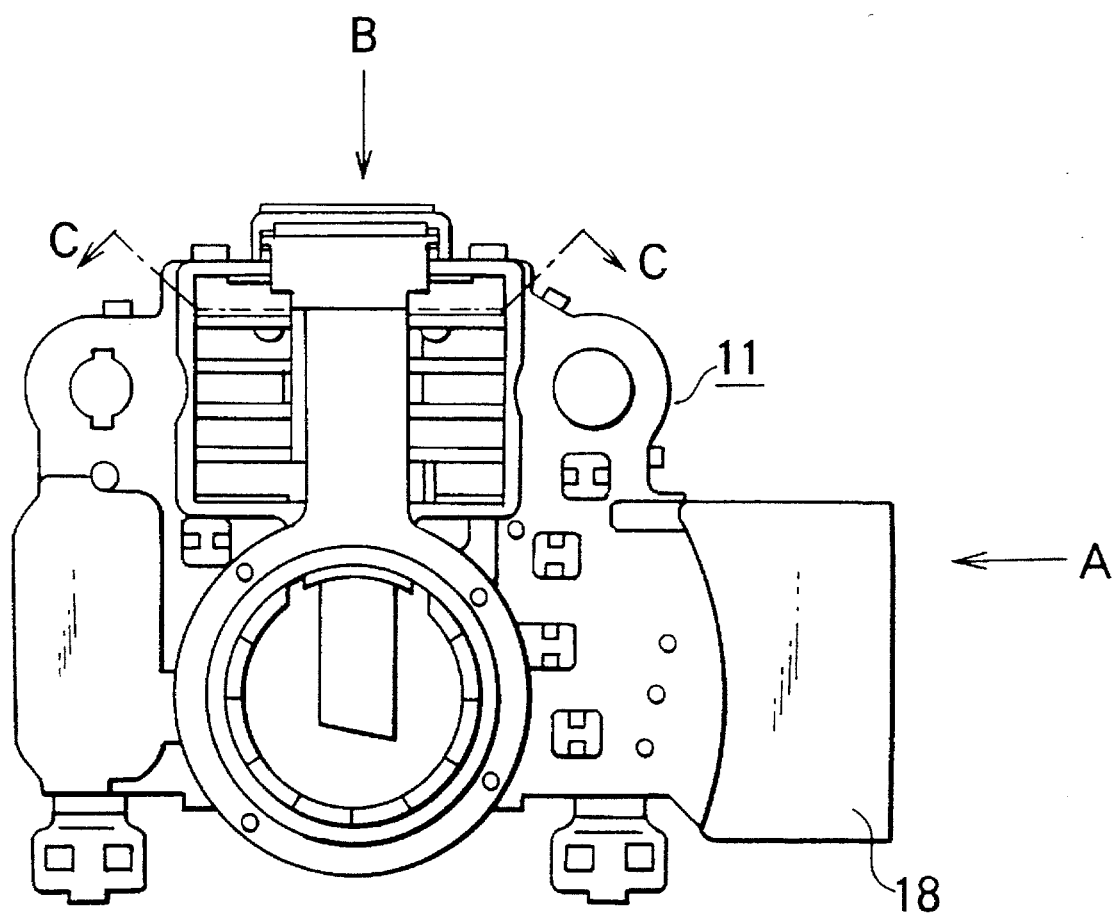
FIG. 8 is a front view showing the control device of FIG. 7.
Figure 9:
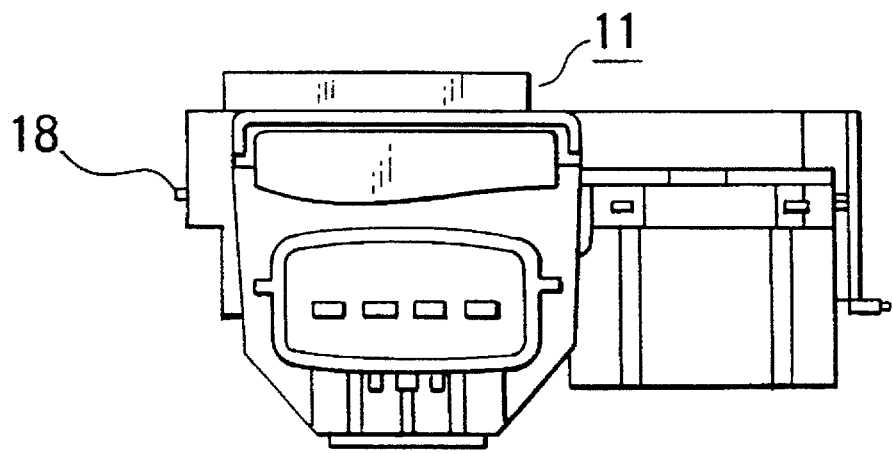
FIG. 9 is a view of the control device of FIG. 8 viewed from A.
Figure 10:
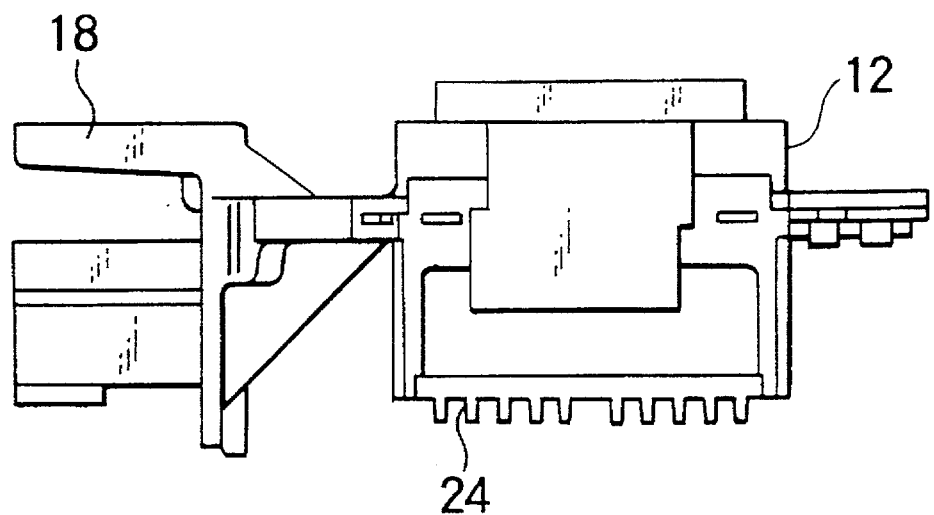
FIG. 10 is a view of the control device of FIG. 8 viewed from B.
Figure 11:
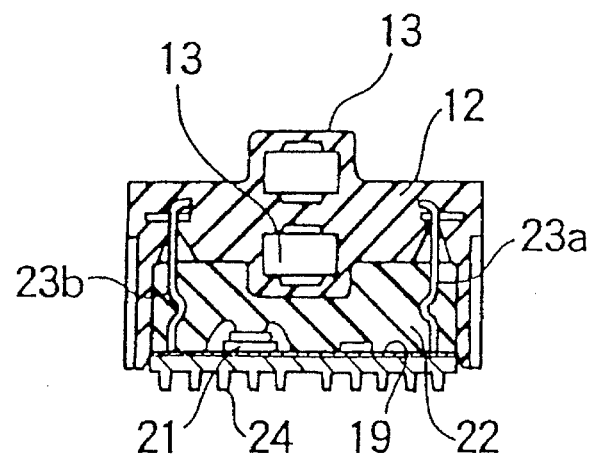
FIG. 11 is a cross-sectional view of the control device taken along the line C—C in FIG. 8.
Figure 12:
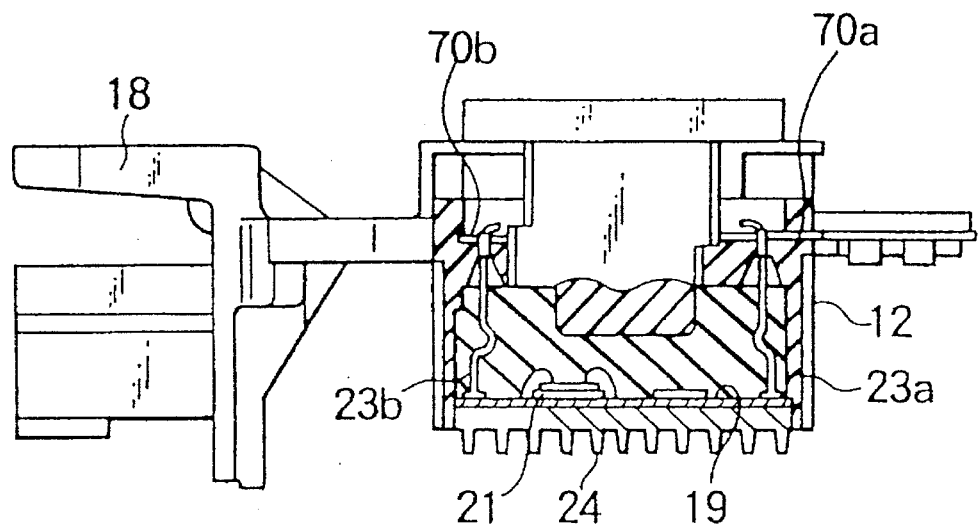
FIG. 12 is a cross-sectional view of the control device, with portions broken away, of FIG. 8.
Figure 13:
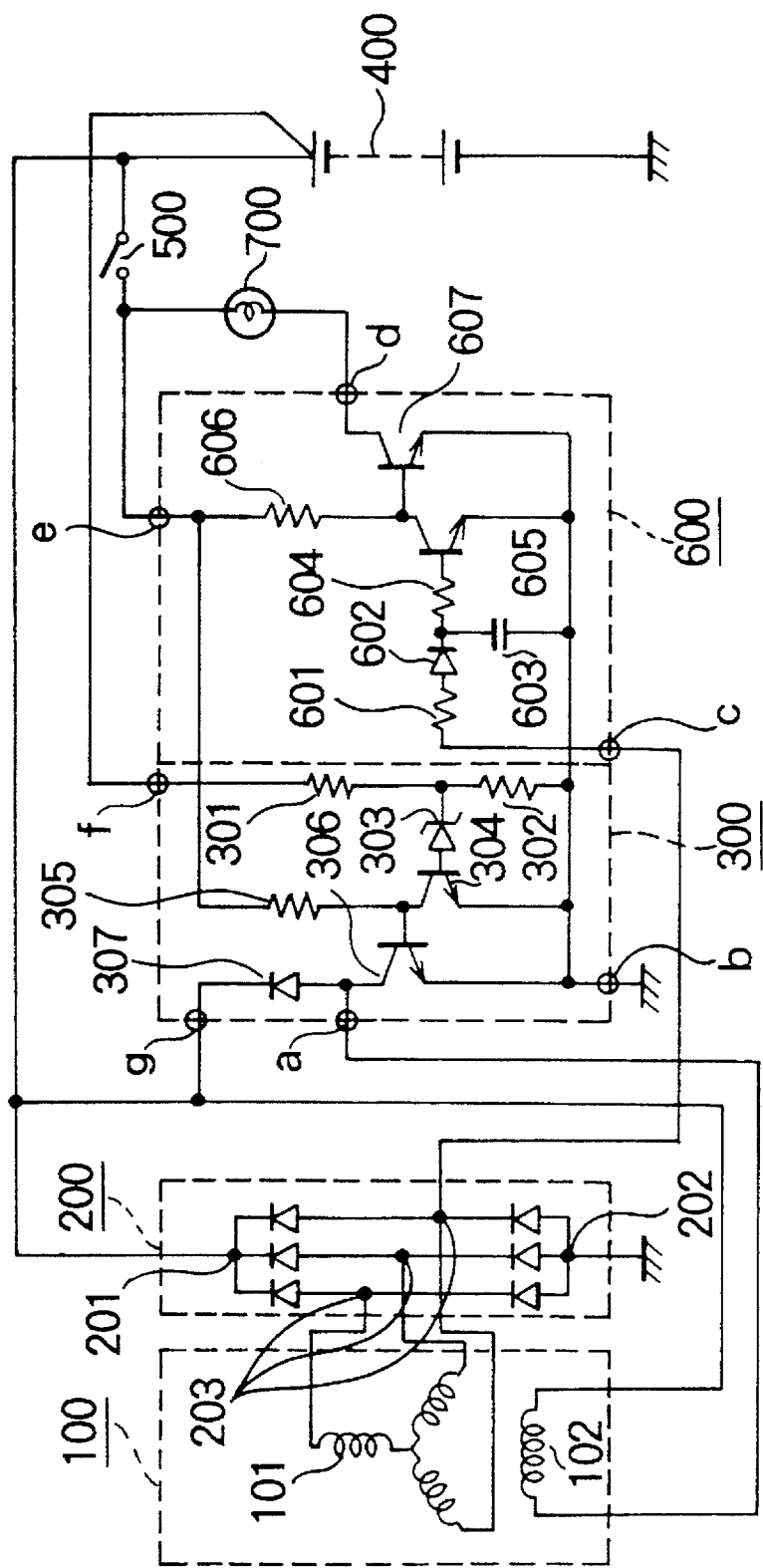
FIG. 13 is a schematic diagram of the vehicle alternating-current generator.

As shown in FIGS. 4 and 5, the end portions of the extension leads 63 have notches 64 so that the end portions may be easily bent. This arrangement enhances ease of manufacturing of the control component.

In the above embodiments, the holder 12 houses the brushes 13. The present invention is also applied to the holder that houses the control component only.

The alignment portion of the extension adapter 53 that receives the control component 51 may be of four-sided frame rather than two-sided frame.

The control component may be constructed of an epoxy-molded one-chip IC rather than an epoxy-molded hybrid IC.

The control component may be constructed of a ceramic package design rather than resin-molded package.

As described above, the control device of the vehicle alternating-current generator according to the present invention allows the control component leads to easily connect to the conductor links by disposing the extension adapter between the control component leads and the conductor links even when the leads of the single in-line package type control component fail to correspond to the conductor links in position. The same holder type is used for a control component having a different lead layout.

Furthermore, according to the control device of the vehicle alternating-current generator of the present invention, the holder designed to accommodate the dual in-line package type control component is used as a holder for the single in-line molded package control component by disposing the extension adapter.

According to the control device of the vehicle alternating-current generator of the present invention, the alignment portion of the extension adapter allows the extension adapter to be easily aligned relative to the control component. Also, the alignment portion facilitates connection of the leads of the control component to the extension leads of the extension adapter.

According to the control device of the vehicle alternating-current generator of the present invention, the integral structure of the control component and the heat sink allows heat generated in the control component to be easily dissipated outwardly. The reliability of the control device is thus enhanced.

According to the control device of the vehicle alternating-current generator of the present invention, the integrally resin molded control component and heat sink eliminates the manufacturing step of assembling a separate heat sink and a control component.

According to the vehicle alternating-current generator of the present invention, the plurality of leads projected out of the single in-line molded package type control component are connected to ends of the extension leads of the extension adapter and other ends of the extension leads are connected to the conductor links. Thus, the same holder type is also used for the control component having a different lead layout.

What is claimed is:

1. An alternating-current generator control device (50) for a motor vehicle, said device comprising:

a) a control component (51) having a voltage regulating section (59) that regulates a generated voltage by controlling a current flowing through an exciting coil (102) of an alternating-current generator, said control component (51) being encased in a single in-line molded package with leads (52) thereof arranged on a single side of said package, b) a holder (12) housing said control component, and provided with a plurality of conductor links (70a, 70b) disposed in two spatially separated groups for external connection; and c) an adapter (53) for establishing an electrical interface between said holder and said single in-line molded package, said adapter having a plurality of leads with first ends disposed along one side thereof for individual connection to said single in-line molded package leads, and second, opposite ends disposed in two spatially separated groups corresponding to said conductor link groups for individual connection thereto.

2. The alternating-current generator control device according to claim 1, wherein the adapter is provided with an alignment carriage with alignment rails (55a, 55b) that align the adapter with the control component.

3. The alternating-current generator control device according to claim 1, wherein a heat sink for dissipating heat generated in the control component is integrally attached to the control component.

4. The alternating-current generator control device according to claim 3, wherein the heat sink and the control component are integrally molded of resin.

* * * * *